(12) United States Patent
Chen et al.

(10) Patent No.: US 7,173,403 B1
(45) Date of Patent: Feb. 6, 2007

(54) BOOST DC/DC CONVERTER

(75) Inventors: Ke-Horng Chen, Taipei (TW);
Chien-Fang Peng, Taipei (TW);
Shih-Min Chen, Hsinchu (TW);
Ming-Tan Hsu, Miaoli (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/308,681

(22) Filed: Apr. 21, 2006

(51) Int. Cl.
*G05F 1/40* (2006.01)
(52) U.S. Cl. ...................................... 323/282
(58) Field of Classification Search ............... 323/222, 323/273, 274, 282, 283, 284, 351; 363/59, 363/60; 327/535, 538
See application file for complete search history.

(56) References Cited

U.S. PATENT DOCUMENTS

| | | | |
|---|---|---|---|
| 6,803,752 B1 | 10/2004 | Chen ......................... | 323/282 |
| 6,867,634 B2 * | 3/2005 | Aiello et al. ................. | 327/335 |
| 6,933,706 B2 * | 8/2005 | Shih ............................ | 323/222 |
| 7,042,743 B2 * | 5/2006 | Pidutti et al. ................. | 363/89 |
| 7,088,084 B2 * | 8/2006 | Sakurai et al. .............. | 323/282 |
| 7,095,220 B2 * | 8/2006 | Kernahan .................... | 323/300 |

OTHER PUBLICATIONS

"Low-Noise Step-Up DC-DC Converters" Maxim Integrated Products, pp. 1-14, 120 San Gabriel Drive, Sunnyvale, CA, USA, 2004.

* cited by examiner

*Primary Examiner*—Adolf Berhane
(74) *Attorney, Agent, or Firm*—Jiang Chyun IP Office

(57) ABSTRACT

A boost DC/DC converter, including a mask circuit, a switched boost circuit, a pulse width modulation (PWM) circuit and an AND gate, is provided. The mask circuit is used to output a mask signal according to a load current. In the present invention, the system can selectively operate in the pulse width modulation mode, the pulse frequency modulation (PFM) mode or the mixed pulse mask mode according to the mask signal corresponding to the load current when the system is under light load, medium load or heavy load respectively, so as to achieve optimal system efficiency.

18 Claims, 5 Drawing Sheets

BOOST DC/DC CONVERTER

BACKGROUND OF THE INVENTION

1. Field of Invention

The present invention relates to a boost DC/DC converter. More particularly, the present invention relates to a boost DC/DC converter applying the pulse modulation technology.

2. Description of Related Art

In power supply converting system, the load variation would correspondingly affect the power supply converting efficiency, so in case of full load or a big load, it is still preferred that the system maintains high efficiency and stable power conversion. As to application, the processor, the random access memory, the display or the hand phone etc., are certainly not in full load all the time, especially the mobile communication products, such as the hand phone, which is in power saving mode most of the time, therefore a power supply converting system which is able to maintain high efficiency under any load state is very important.

FIG. 1 is a schematic block diagram of a conventional boost DC/DC converter 100. When only the pulse wide modulation mode is used, the converter 100 comprises a switched boost circuit 110, a pulse width modulation circuit 120 and a load 130. Wherein, the switched boost circuit 110 comprises an inductor 111, a diode 112, a capacitor 113 and a power transistor 114. The power transistor 114 is switched on or off through pulse width modulation. When the power transistor 114 is on, the diode 112 is in reverse bias, and the electrical energy from an input voltage Vin1 is stored in the inductor 111, wherein the load's electrical energy is provided by the capacitor 113. When the power transistor 114 is off, the diode 112 is in forward bias, wherein the capacitor 113 and the load 130 absorb the electrical energy provided by the input voltage Vin1 and the inductor 111, thus Vout1>Vin1.

The pulse width modulation circuit 120 comprises a control feedback circuit, which includes an error amplifier 121, a triangular waveform generator 122, a pulse width modulation comparator 123 and a driver 124. After divided by the resistor R1 and R2 (Vout1×R2/(R1+R2)), the output voltage Vout1 of the switched boost circuit 110 compares with a reference voltage Vref1 by the error amplifier 121, and the pulse width modulation comparator 123 receives the output signal from the error amplifier 121 and compares with the output signal from the triangular waveform generator 122, a pulse width modulation signal PWM_CK is generated. And then the pulse width modulation signal PWM_CK is amplified through the driver 124 and then drives the power transistor 114.

Referring to FIG. 2, which is a relation diagram between the load current and the system efficiency of a boost DC/DC converter 100 shown in FIG. 1. When only the pulse wide modulation mode is used in the boost DC/DC converter 100, it's known from FIG. 2 that, in the boost DC/DC converter 100, when the load current IL1 is low (light load), the system efficiency is lower than when the load current IL1 is high (heavy load). It is because the pulse width modulation is controlled by fixed frequency. Even in light load, the power transistor 114 performs the switching at same frequency as in heavy load, thus consuming unnecessary switching power on the power transistor 114, increasing overall input power loss and reducing system efficiency. Therefore, a boost DC/DC converter capable of enhancing the system efficiency is desired.

SUMMARY OF THE INVENTION

Accordingly, the present invention is directed to provide a boost DC/DC converter, which can enable the system to selectively operate in the pulse width modulation mode, the pulse frequency modulation mode or the mixed pulse mask mode respectively through the mask signal corresponding to the load current when the system is in light load, medium load or heavy load. The boost DC/DC converter is able to achieve optimal system efficiency so as to improve the system efficiency of the conventional boost DC/DC converter when the system is in light load.

To achieve above or other goals, the present invention provides a boost DC/DC converter, which comprises a switched boost circuit, a pulse width modulation circuit, a mask circuit and an AND gate. The switched boost circuit is used to receive an input voltage and provide an output voltage according to a control signal, wherein the output voltage is greater than the input voltage. The pulse width modulation circuit is used to output a pulse width modulation signal according to the output voltage and a reference voltage. The mask circuit is used to output a mask signal according to a load current of the boost DC/DC converter of the present invention. The AND gate is used to receive the pulse width modulation signal and the mask signal and then output the control signal, wherein the duty cycle of the mask signal varies according to the load current.

In an embodiment, the boost DC/DC converter further comprises a driver and a voltage dividing circuit. The driver can amplify and output the control signal of the AND gate to the switched boost circuit. The voltage dividing circuit includes a first resistor and a second resistor, wherein the first resistor is electrically connected to the output voltage, the first terminal of the second resistor is connected to the first resistor while the second terminal of the second resistor is connected to the ground. The connecting point of the first resistor and the second resistor is also electrically connected to the pulse width modulation circuit. The voltage dividing circuit can output the output voltage of the switched boost circuit to the pulse width modulation circuit after decreasing the output voltage of the switched boost circuit by a preset proportion.

In an embodiment, the switched boost circuit of the boost DC/DC converter comprises an inductor, a diode, a capacitor and a switch. Wherein, the inductor is electrically connected to the input voltage. The diode's anode is electrically connected to the inductor, the capacitor's first terminal is electrically connected to the diode's cathode and the output voltage and the capacitor's second terminal is grounded. The switch's first terminal is electrically connected between the inductor and the diode's anode and the switch's second terminal is grounded. The first terminal and the second terminal of the switch are connected or disconnected according to the control signal. In an embodiment, the switch is an n-channel Metal-Oxide-Semiconductor (NMOS) transistor, and the gate terminal thereof receives the control signal.

The pulse width modulation circuit comprises an error amplifier, a triangular waveform generator and a comparator. Wherein, the error amplifier's first terminal receives a reference voltage and the second terminal thereof is electrically connected to the divided voltage of the output voltage, to amplify and output the voltage between the first terminal and the second terminal. The triangular waveform generator is used to output a triangular waveform, and then the comparator outputs the pulse width modulation signal according to the comparison result of the triangular waveform with the output voltage of the error amplifier. Wherein, if the voltage of the triangular waveform is greater than the output voltage of the error amplifier, the comparator outputs the logic high level; otherwise, the comparator outputs logic low level.

In an embodiment, the mask circuit of the boost DC/DC converter comprises a load detector and a mask signal generator. Wherein, the load detector is used to output a load signal according to a load current, and the mask signal generator is used to generate the mask signal according to the load signal. The load signal can be a voltage signal, and is an increasing function of the load current. Moreover, the mask signal generator comprises a delay chain and an register, wherein the delay chain generates a digital signal according to the load signal and the clock signal, while the register obtains the digital signal periodically, and generates the mask signal according to the obtained digital signal.

In an embodiment, the register mentioned above is a parallel in/serial out register.

In an embodiment, the delay chain of the boost DC/DC converter comprises a plurality of delay units, wherein every delay unit receives the load signal. The first delay unit outputs the clock signal after delaying a preset time. The delay unit i outputs the output of the delay unit i−1 after delaying a preset time, wherein i is an integer greater than 1. The digital signal is composed of the outputs from the delay units, and the preset time is a decreasing function of the load current.

In an embodiment, every delay unit of the boost DC/DC converter resets the output of the delay unit periodically according to a reset signal. In the digital signal obtained by the register, the number of bits with value of 1 is the increasing function of the load current. If the number of bits with value of 1 in the digital signal obtained by the register is smaller than a preset value, the register generates the mask signal by pulse frequency modulation.

In the boost DC/DC converter of the present invention, when the system is in heavy load, the pulse width modulation mode is used; when the system is in light load, the pulse frequency modulation mode is used; and when the system is neither in heavy load nor in light load, but in medium load, the mixed pulse mask mode is used by the system. That is, the boost DC/DC converter of the present invention can determine if the mask signal's mode is the pulse width modulation mode or the pulse frequency modulation mode or the mixed pulse mask mode according to the load current. No matter the system is in heavy load or light load, the switching times of the power transistor can be adjusted by the mask signal, so that unnecessary power loss on the power transistor can be reduced and the system converting efficiency can be enhanced.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
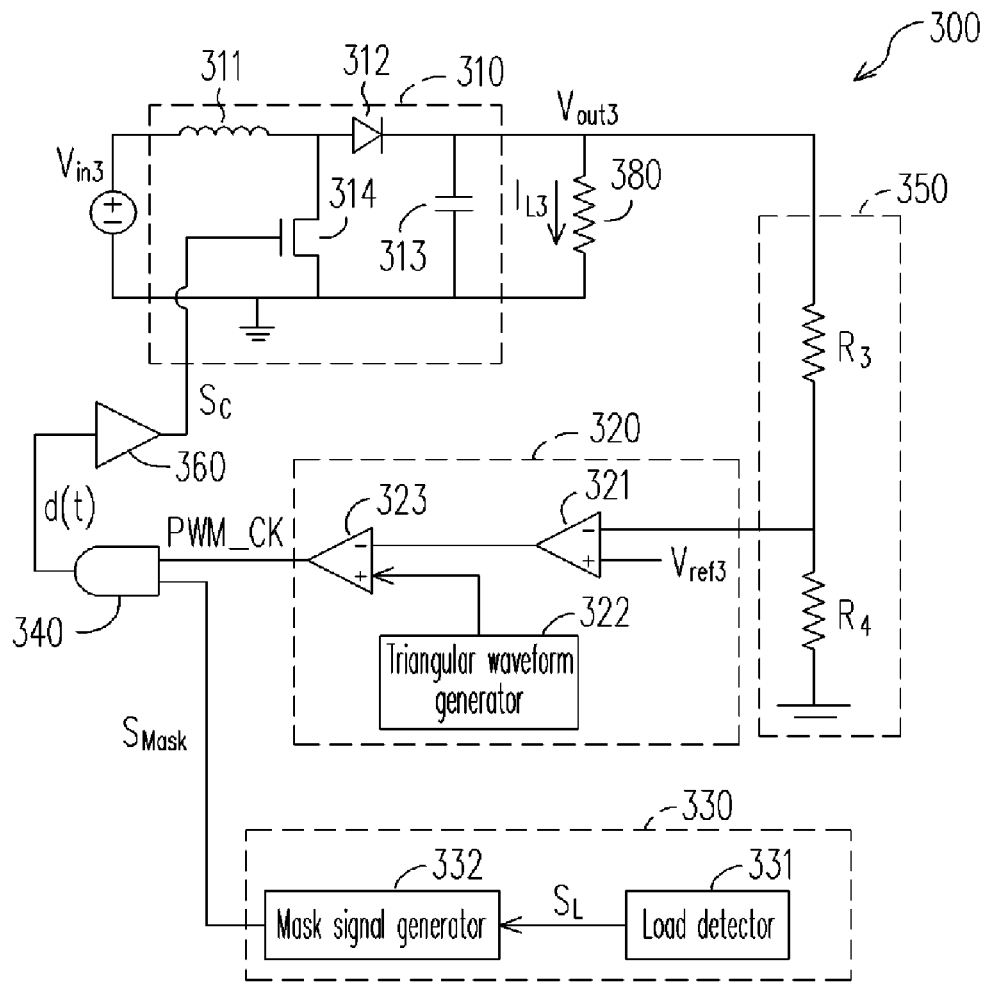
FIG. 3 is a schematic block diagram of a boost DC/DC converter according to an embodiment of the present invention.

The description below is an embodiment of the present invention. FIG. 3 is a schematic block diagram of a boost DC/DC converter 300 according to an embodiment of the present invention. The boost DC/DC converter 300 comprises a switched boost circuit 310, a pulse width modulation circuit 320, a mask circuit 330, an AND gate 340, a voltage dividing circuit 350 and a driver 360.

The switched boost circuit 310 provides an output voltage Vout3 according to a control signal Sc and an input voltage Vin3, wherein the output voltage Vout3 is greater than the input voltage Vin3. And the pulse width modulation circuit 320 can output a pulse width modulation signal PWM_CK according to the divided voltage of the output voltage Vout3 (Vout3×R4/(R3+R4)) and a reference voltage Vref3. The mask circuit 330 outputs a mask signal Smask according to a load current IL3. The AND gate 340 receives the pulse width modulation signal PWM_CK and the mask signal Smask, and then provides a control signal d(t).

Figure 1:
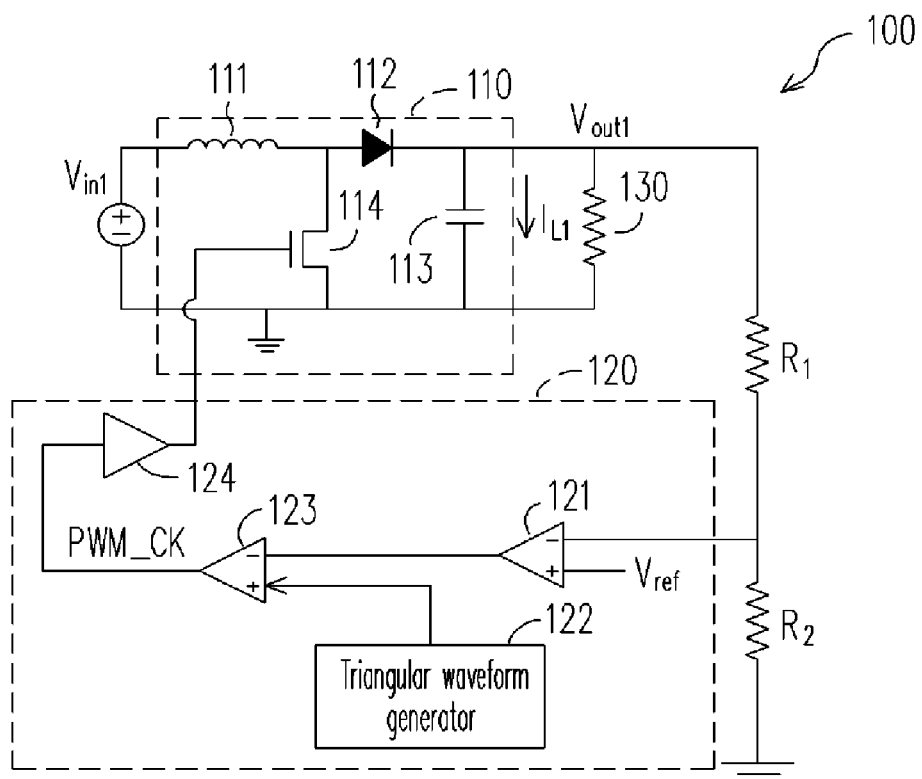
FIG. 1 is a schematic block diagram of a conventional boost DC/DC converter.
Figure 2:
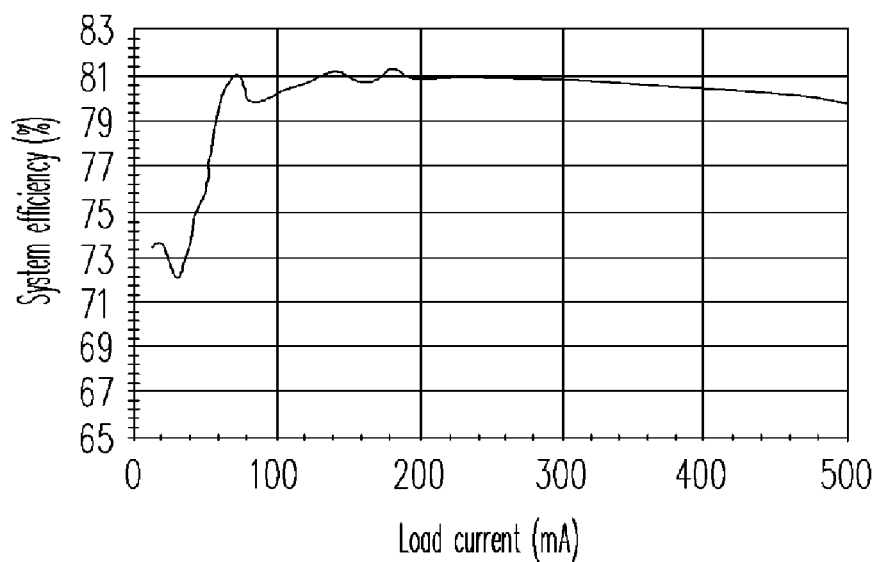
FIG. 2 is a relation curve between load and efficiency of a conventional boost DC/DC converter.

In the embodiment, the switched boost circuit 310 comprises an inductor 311, a diode 312, a capacitor 313 and a switch 314. The inductor 311 is electrically connected to the input voltage Vin3, the anode of the diode 312 is electrically connected to the inductor 311, the first terminal of the capacitor 313 is electrically connected to the diode 312's cathode and the output voltage Vout3, and the second terminal thereof is grounded. The first terminal of the switch 314 is electrically connected between the capacitor 311 and the diode 312's anode and the second terminal thereof is grounded, and the first terminal and the second terminal of the switch 314 are connected or disconnected according to the received control signal Sc. In the embodiment, the switch 314 is an n-channel Metal-Oxide-Semiconductor (NMOS) transistor, and the gate terminal thereof receives the control signal Sc. As the operation process of the switched boost circuit 310 is similar to the switched boost circuit 110 shown in FIG. 1, the details are not repeated herein.

And in the embodiment, the pulse width modulation circuit 320 comprises an error amplifier 321, a triangular waveform generator 322 and a comparator 323. Wherein, the first terminal of the error amplifier 321 receives a reference voltage Vref3 and the second terminal thereof is electrically connected to the divided voltage of the output voltage Vout3, to amplify and output the difference voltage between the reference voltage Vref3 and the divided voltage of the output voltage Vout3. The triangular waveform generator 322 is used to output a triangular waveform, then the comparator 323 outputs pulse width modulation signal PWM_CK according to the comparison result of the triangular waveform with the output voltage of the error amplifier 321. Wherein, if the voltage of the triangular waveform is greater than the output voltage of the error amplifier, the comparator outputs logic high level; otherwise, the comparator outputs logic low level, and vice versa.

In the embodiment, the mask circuit 330 comprises a load detector 331 and a mask signal generator 332, wherein the load detector 331 is used to detect a load current IL3 and output a corresponding load signal SL. In the embodiment, the corresponding load signal SL is a voltage signal and the value increases as the load current IL3 increases. The mask signal generator 332 outputs a corresponding mask signal Smask according to the load signal SL.

The boost DC/DC converter 300 in the embodiment further comprises a voltage dividing circuit 350 and a driver 360. The voltage dividing circuit 350 includes a first resistor R3 and a second resistor R4 and it multiplies the output voltage Vout3 by a preset proportion R4/(R3+R4) to such that Vout3×R4/(R3+R4)) is close to the reference voltage Vref3 for it to be output to the comparator 323. In the voltage dividing circuit 350, the resistor R3 is electrically connected to the output voltage Vout3, the first terminal of the resistor R4 is electrically connected to the first resistor R3 while the second terminal is grounded. Wherein, the connecting point of the resistor R3 and the resistor R4 is also electrically connected to the pulse width modulation circuit 320. In the embodiment, when the difference between the output voltage Vout3 and the reference voltage Vref3 is very big, the voltage dividing circuit 350 divides the output voltage Vout3 such that the divided voltage of the output voltage Vout3 is close to the reference voltage Vref3 for it to be input to the error amplifier 321. When the output voltage Vout3 is close to the reference voltage Vref3, the voltage dividing circuit 350 can be omitted. The driver 360 can be used to amplify the control signal d(t) from the AND gate 340 to the control signal Sc, which is output to the switched boost circuit 310.

Figure 4:
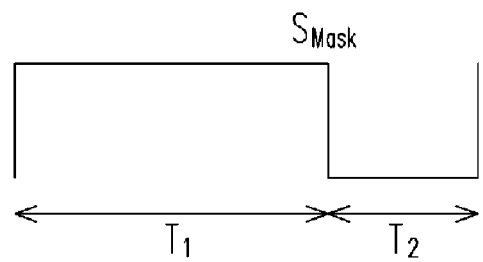
FIG. 4 is a schematic block diagram of a mask signal according to an embodiment of the present invention.

FIG. 4 is a schematic block diagram of a mask signal of the embodiment. The period of the mask signal Smask is T1+T2, wherein T1 is the duty cycle. The duty cycle T1 is decided based on the load current IL3; that is, the duty cycle T1 of the mask signal Smask increases as the load current IL3 increases.

Figure 5:
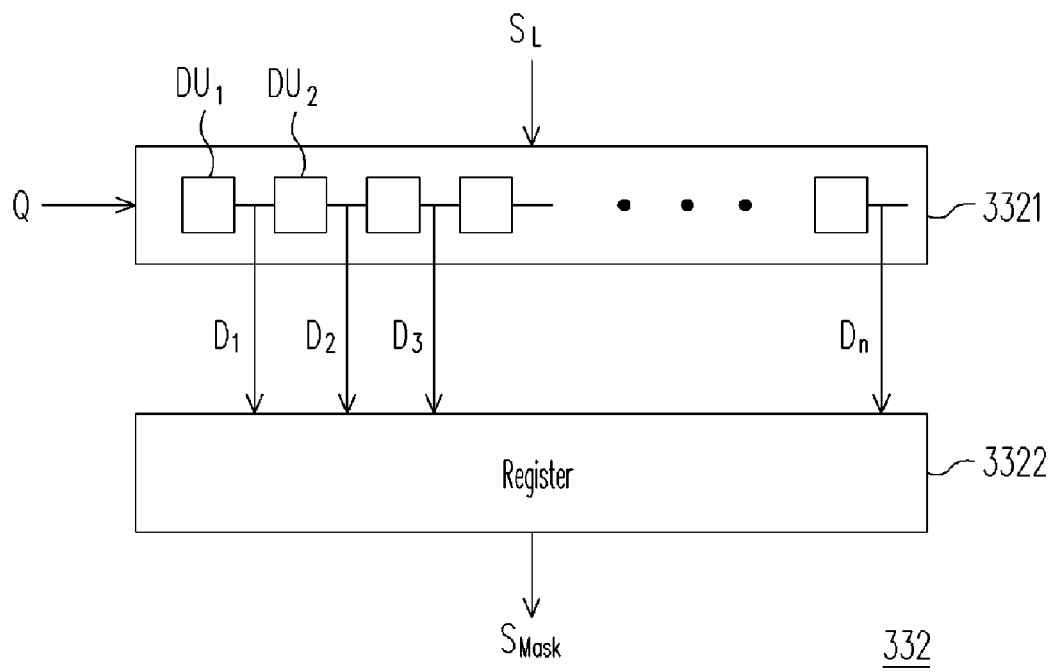
FIG. 5 is an internal structure diagram of a mask signal generator according to an embodiment of the present invention.

Referring to FIG. 5, an internal structure diagram of a mask signal generator 332 is shown. The mask signal generator 332 includes a delay chain 3321 and an register 3322, wherein the delay chain 3321 can generate the digital signal D1~Dn (wherein n is an integer greater than 1) according to the load signal SL provided by the load detector 331 and the clock signal Q. In the embodiment below, assuming N=5 and the register 3322 can pick up the digital signal D1~D5 regularly, the register 3322 can generate the mask signal Smask according to the picked digital signal D1~D5 to select the mode of the mask signal Smask required by the present system from one of the pulse width modulation mode, the pulse frequency modulation mode or the mixed pulse mask mode. In this embodiment, the register 3322 is a parallel in/serial out register.

Figure 6:
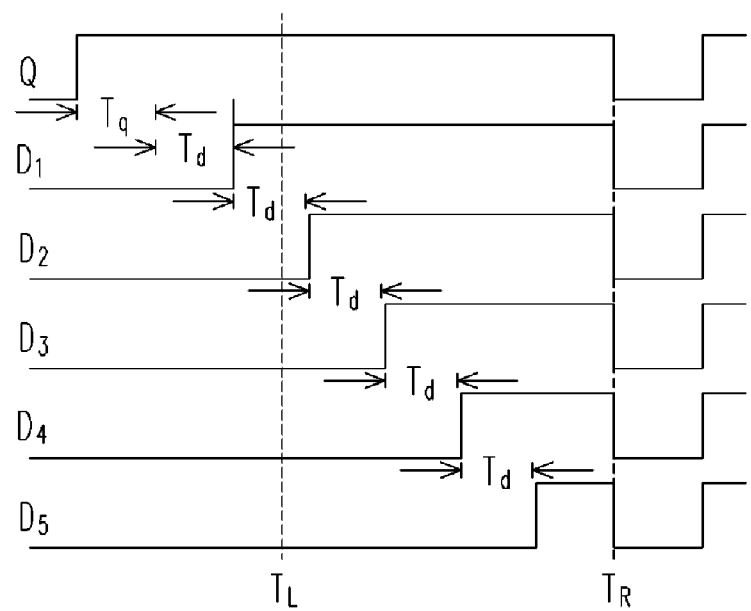
FIG. 6 is a schematic block diagram of the operating principle of a mask signal generator according to an embodiment of the present invention.

Referring to FIG. 6, a schematic block diagram of the operating principle of a mask signal generator 332 is shown. The delay chain 3321 comprises 5 delay units DU1~DU5. Each delay unit DU1~DU5 receives the load signal SL, wherein, the first delay unit DU1 delays the clock signal Q for a preset time Td and outputs it as D1. The i delay unit DUi delays the output of the i–1 delay unit Di–1 for a preset time Td and outputs it as Di, for example. The output of DU3 is delayed for a preset time Td compared to DU2, wherein i is an integer greater than 1. In the embodiment, the delay units are characterized by the inverse proportion between the delay preset time Td and the load signal SL. Thus, the load signal SL increases as the load current increases, while the preset time Td decreases. At the picking-up time $T_L$, the register 3322 picks up the digital signal D1~D5. When the register 3322 is picking, the number of bits of the digital signal D1~D5 in the high level is increased. For example, 5 bits of the digital signal are in high level, and the digital signal D1~D5 is 11111. On the other hand, the load signal SL decreases as the load current decreases, while the preset time Td increases. When the register 3322 is picking, the number of bits of the digital signal D1~D5 in the high level decreases. For example, only 3 bits of the digital signal are in high level, and the digital signal D1~D5 is 11100. At the reset time TR, each delay unit DU1~DU5 is triggered by a reset signal and resets the outputs of the delay units DU1~DU5 to logic low level.

Figure 7:
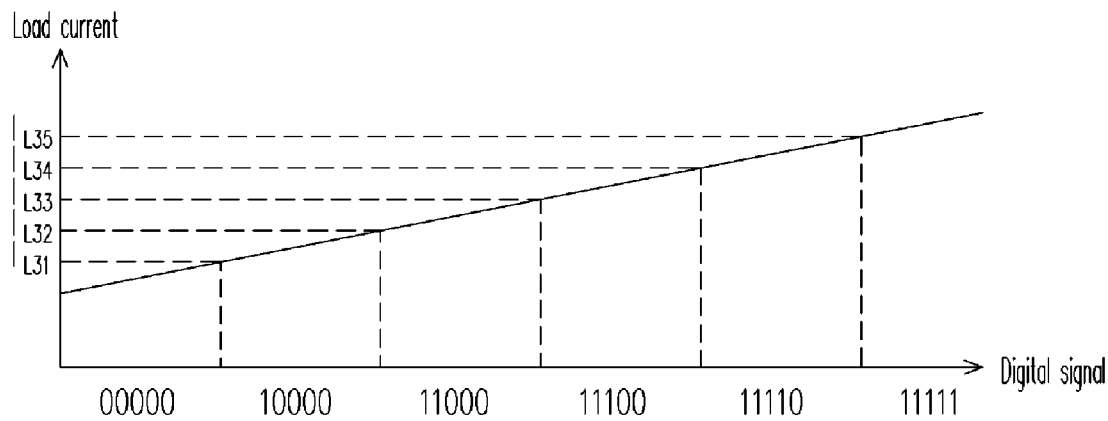
FIG. 7 is a relation curve between the digital signal and load current according to an embodiment of the present invention.

Next, FIG. 7 is a relation curve between the digital signal D1~D5 and the load current IL3 of the embodiment. When the digital signal (D1~D5) is (00000) or (10000), the load current is less than IL32 and the load is light, and the duty cycle of the mask signal Smask output by the register 3322 is smaller, the mask signal Smask would enable the boost DC/DC converter 300 to operate in the pulse frequency modulation mode. When the digital signal (D1~D5) is (11111), the load current is greater than IL35 and the load is heavy, and the duty cycle of the mask signal Smask output by the register 3322 is bigger, the mask signal Smask would enable the boost DC/DC converter 300 to operate in the pulse width modulation mode. When the digital signal (D1~D5) is (11000), (11100) or (11110), the load current is between IL32 and IL35, and the load is medium, and the duty cycle of the mask signal Smask output by the register 3322 is between the two modes described above, the mask signal Smask would enable the boost DC/DC converter 300 to operate in the mixed pulse mask mode.

In the mixed pulse mask mode and the pulse width modulation mode, the duty cycle of the mask signal Smask and the number of high level bits of the digital signal (D1~D5) have direct proportion. For example, when the digital signal (D1~D5) is (11000), the number of high level bits is 2, and the duty cycle of the mask signal Smask is ⅖=40%. On the other hand, when the digital signal (D1~D5) is (11100), the number of high level bits is 3, and the duty cycle of the mask signal Smask is ⅗=60%. The rest can be analogized under the same principle.

Figure 8:
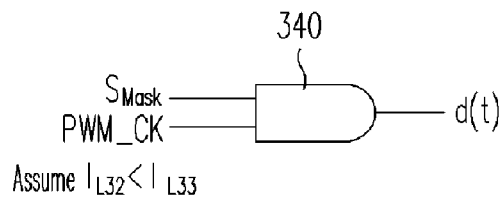
FIG. 8 is a schematic block diagram of the operation of an AND gate according to an embodiment of the present invention.
Figure 8:
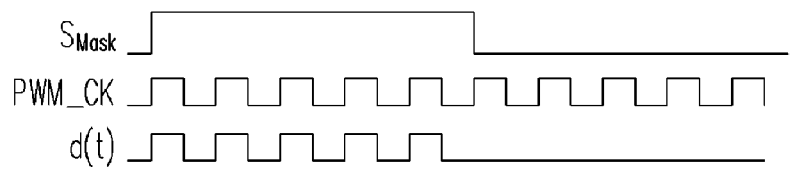
Figure 8:
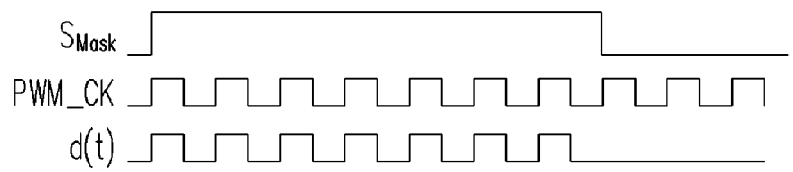

FIG. 8 is a schematic block diagram of operation of an AND gate 340. When the duty cycle of the mask signal Smask is bigger, the number of pulses of the AND gate 340's control signal d(t) increases, as shown in FIG. 8. When the load current IL32<IL33, the AND gate 340's control signal d(t) corresponding to IL33 is greater than IL32; that is, there is smaller number of pulses of the control signal d(t) corresponding to IL32, thus reducing the switching frequency of the switch 314 shown in FIG. 3, so that the switching loss can be reduced and the system efficiency is enhanced.

In conclusion, the load detector 331 can detect the load current IL3 and output the corresponding load signal SL, then the mask signal generator 332 provides the mask signal Smask according to the load signal SL, and then the AND gate 340 provides the control signal d(t) according to the mask signal Smask and the pulse modulation signal PWM_CK. Next, the driver 360 outputs the amplified control signal Sc to the switch 314 of the switched boost circuit 310. Therefore, the boost DC/DC converter of the embodiment can selectively operate in the pulse width modulation mode, the pulse frequency modulation mode or the mixed pulse mask mode according to the load current.

Figure 9:
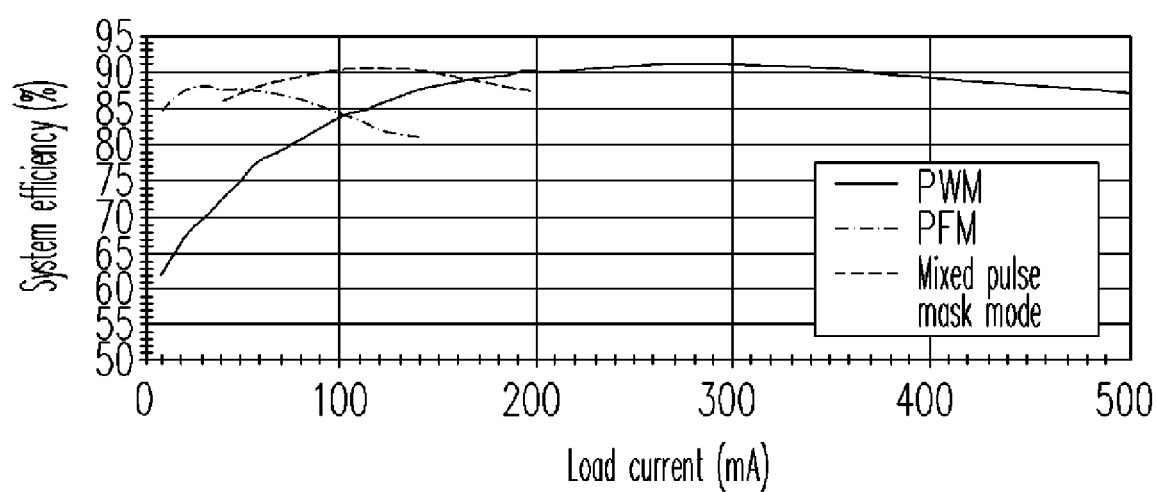
FIG. 9 is a schematic diagram showing the efficiency of the pulse width modulation mode, the pulse frequency modulation mode or the mixed pulse mask mode according to an embodiment of the present invention.

FIG. 9 is a comparison diagram of the pulse width modulation mode, the pulse frequency modulation mode and the mixed pulse mask mode of the embodiment. Taking the boost DC/DC converter 300 applied in a hand phone as an example, when it is in a heavy mode (when the hand phone is under busy mode) the pulse width modulation mode is applied; when it is in a light mode (when the hand phone is under power-saving mode), the pulse frequency modulation mode is applied, to avoid the loss of the switching frequency from decreasing the power converting efficiency. The mixed pulse mask mode is therefore used in the medium mode, so that the system can maintain high power converting efficiency, as shown in FIG. 9. It is known from the illustration above, the system can selectively operate in the pulse width modulation mode, the pulse frequency modulation mode or the mixed pulse mask mode depending on whether the system is in a light load, a medium load or a heavy load, so that the system can maintain high power converting efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A boost DC/DC converter, comprising:
   a switched boost circuit, receiving an input voltage and providing an output voltage according to a control signal, wherein the output voltage is greater than the input voltage;
   a pulse width modulation circuit, outputting a pulse width modulation signal according to said output voltage and a reference voltage;
   a mask circuit, outputting a mask signal according to a load current of said boost DC/DC converter; and
   an AND gate, receiving said pulse width modulation signal and said mask signal and then outputting said control signal.

2. The boost DC/DC converter as claimed in claim 1, further comprising:
   a voltage dividing circuit, outputting said output voltage to said pulse width modulation circuit after decreasing said output voltage by a preset proportion.

3. The boost DC/DC converter as claimed in claim 2, wherein the voltage dividing circuit includes:
   a first resistor, electrically connected to said output voltage; and
   a second resistor, having a first terminal electrically connected to said first resistor and a second terminal grounded;
   wherein the connecting point of said first resistor and said second resistor is also electrically connected to said pulse width modulation circuit.

4. The boost DC/DC converter as claimed in claim 1, further comprising:
   a driver, amplifying and outputting said control signal to said switched boost circuit.

5. The boost DC/DC converter as claimed in claim 1, wherein said switched boost circuit comprises:
   an inductor, electrically connected to said input voltage;
   a diode, having an anode electrically connected to said inductor;
   a capacitor, having a first terminal electrically connected to said diode's cathode and said output voltage and a second terminal grounded; and
   a switch, having a first terminal electrically connected between said inductor and said diode's anode and a second terminal grounded, connecting or disconnecting the first terminal and the second terminal of said switch according to said control signal.

6. The boost DC/DC converter as claimed in claim 5, wherein said switch is an n-channel Metal-Oxide-Semiconductor (NMOS) transistor, having a gate terminal for receiving said control signal.

7. The boost DC/DC converter as claimed in claim 1, wherein said pulse width modulation circuit comprises:
   an error amplifier, having a first terminal receiving said reference voltage and a second terminal electrically connected to said output voltage, to amplify and then output the voltage between the first terminal and the second terminal;
   a triangular waveform generator, outputting a triangular waveform; and
   a comparator, outputting said pulse width modulation signal according to the comparison result of said triangular waveform with the output voltage of said error amplifier.

8. The boost DC/DC converter as claimed in claim 7, wherein, if the voltage of said triangular waveform is greater than the output voltage of said error amplifier, said comparator outputs logic high level; otherwise, said comparator outputs logic low level.

9. The boost DC/DC converter as claimed in claim 1, wherein the duty cycle of said mask signal varies according to said load current.

10. The boost DC/DC converter as claimed in claim 1, wherein said mask circuit comprises:
    a load detector, outputting a load signal according to said load current; and
    a mask signal generator, generating said mask signal according to said load signal.

11. The boost DC/DC converter as claimed in claim 10, wherein said load signal is a voltage signal, and is an increasing function of said load current.

12. The boost DC/DC converter as claimed in claim 10, wherein said mask signal generator comprises:
    a delay chain, generating a digital signal according to said load signal and a clock signal; and
    an register, obtaining said digital signal periodically, and generating said mask signal according to the obtained digital signal.

13. The boost DC/DC converter as claimed in claim 12, wherein said register is a parallel in/serial out register.

14. The boost DC/DC converter as claimed in claim 12, wherein said delay chain comprises:
    a plurality of delay units, each delay unit receiving said load signal, wherein the first delay unit outputs said clock signal after delaying a preset time, the delay unit i outputting the output of the delay unit i−1 after delaying said preset time, wherein i is an integer greater than 1, said digital signal is composed of the outputs from said delay units, and said preset time is a decreasing function of said load current.

15. The boost DC/DC converter as claimed in claim 14, wherein each delay unit resets the output of said delay unit periodically according to a reset signal.

16. The boost DC/DC converter as claimed in claim 12, wherein in said digital signal obtained by said register, the number of bits with value of 1 is an increasing function of said load current.

17. The boost DC/DC converter as claimed in claim 12, wherein the duty cycle of said mask signal is an increasing function of the number of bits with value of 1 in said digital signal obtained by said register.

18. The boost DC/DC converter as claimed in claim 17, wherein in said digital signal obtained by said register, if the number of bits with value of 1 is smaller than a preset value, said register generates said mask signal by pulse frequency modulation.

* * * * *